May 20, 1947.    R. F. HENNINGFIELD    2,420,777
THERMOSTATIC SWITCH FOR HOT WATER SUPPLY
Filed June 9, 1944
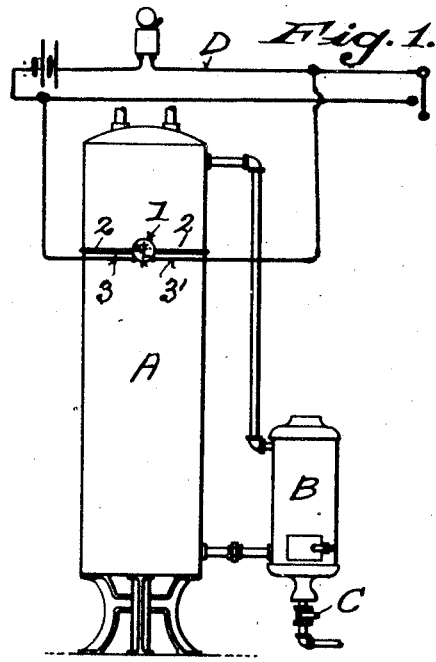
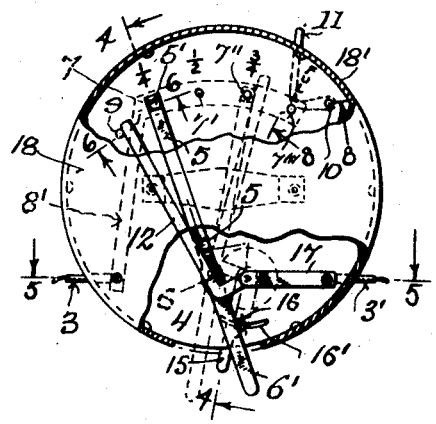
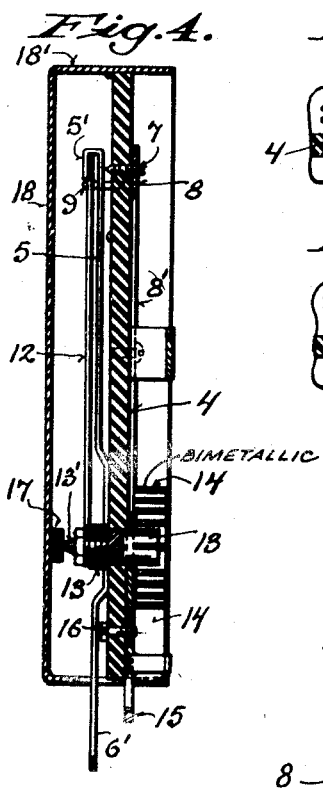
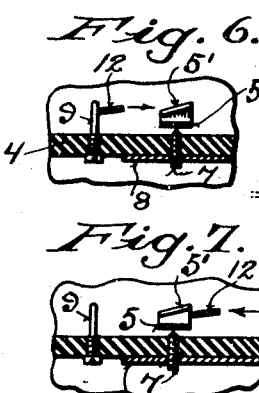
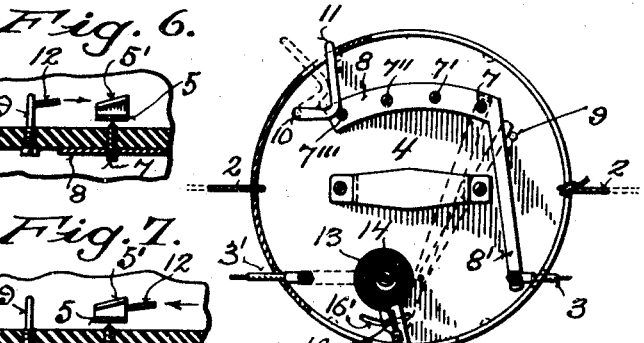
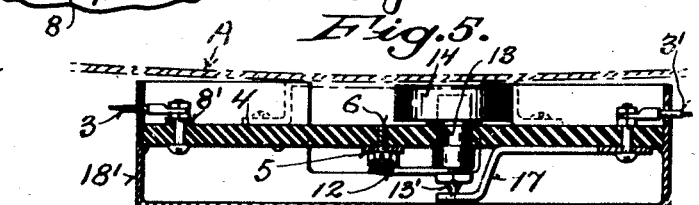
INVENTOR
ROLAND F. HENNINGFIELD
BY
ATTORNEYS Patented May 20, 1947

2,420,777

UNITED STATES PATENT OFFICE 2,420,777

THERMOSTATIC SWITCH FOR HOT-WATER SUPPLY

Roland F. Henningfield, Racine, Wis.

Application June 9, 1944, Serial No. 539,485

2 Claims. (Cl. 200—138)

My invention refers to domestic hot water system supply control and it has for its primary object to provide a simple economical and effective thermostatic controlled water supply cut-off attachment for predetermined volumes from the tank. For example a minimum volume cut-off may approximate ¼. Other cut-offs may be ½, ¾ and full tank in volume.

My equipment can be manufactured and sold to the public at such low cost that all homes, in the lower bracket, can well afford to use the equipment. Furthermore, the apparatus may be a house to house canvassing product and installed quickly by those unskilled in the mechanical arts.

Specific objects of my invention are to provide a novel thermostat attachable to the upper portion of the water tank and connected in an electrical bell circuit, whereby a signal is given when the desired volume of water is heated, whereby the fuel of the heater may be manually cut off when the signal is given. In the event that the audible signal is disregarded, the volume of the tank water will continue to heat to its full capacity and the thermostat having broken the alarm circuit, will again close said circuit permanently, whereby the alarm will continue until cut off by a manual switch, carried by a closure pin, with which the thermostat arm engages.

Another object of my invention is to provide a manually adjustable pivoted set-arm for heating different water volumes and a thermostatic finger for closing an alarm signal, by pressure exerted upon the set-arm, whereby the alarm circuit is closed.

Another object is to provide a set-arm and finger with associated means for returning the set-arm to its normal position, controlling the minimum volume of water, when said set-arm has been adjusted, for example, to heat approximately ½ of the tank volume or more.

A further object of my invention is to provide a loop or tongue terminal for the set-arm, whereby the thermostatic finger will return to its zero position through the tongue loop when the minimum volume of water has been drawn off and the tank is cool.

With the above and other objects in view, the invention consists in certain peculiarities of construction and combination of parts as will be fully set forth with reference to the accompanying drawings and subsequently claimed.

In the drawings:

Figure 1 represents a diagrammatic view of a standard water heating system equipped with a thermostat embodying the features of my invention.

Figure 2 an enlarged face view of the thermostat with parts broken away and in section to more clearly illustrate structural features.

Figure 3 a back or rear view of the thermostat with the rim of a cover partly in section to illustrate structural features.

Figure 4 a longitudinal sectional elevation of the thermostat, the section being indicated by line 4—4 of Figure 2.

Figure 5 a cross section of the same, the section being indicated by line 5—5 of Figure 2.

Figures 6 and 7 detailed sectional views of the circuit make and break mechanism between a set-arm and thermostatically controlled finger in their make and break positions, the sections being indicated by line 6—6 of Figure 2.

Figure 8 a detailed sectional elevation of a final make and break connection for closing an electric circuit in connection with the thermostatic finger, the same being indicated in dotted lines and the section is indicated by line 8—8 of Figure 2.

Referring by characters to Figure 1 of the drawings, A indicates a water supply tank and B a water heater in pipe connection with the tank, said heater being provided with a fuel controlling valve C, all of which mechanism is of standard type.

Secured about the upper portion tank A at approximately ¼ of the length of said tank is a thermostat unit 1, by cords 2, whereby the sensitive element of the thermostat is held snugly against the face of the tank.

For convenience and economy, a house bell circuit D is connected to the thermostat by wires 3—3'.

Referring now especially to Figures 2 to 8 inclusive, 4 indicates a circular plate or dial formed from any suitable nonconducting material. Mounted upon the face of the plate is a delicate spring metal set-arm 5, the same being mounted upon a pivot 6 positioned near the lower portion of the dial or plate 4 and approximately centrally of the same.

The upper portion of the dial or plate 4 is provided with a series of spaced contact points 7, 7', 7'', and 7''', the same being positioned radially with respect to the set-arm pivot 6, designated in dotted lines of Figure 2 and in full lines of Figure 5. These contact points are carried by a segmental metallic strip 8 upon the back face of plate 4, and said strip terminates at one end with a downwardly extended arm 8' at the end of which it is electrically connected to the circuit wire 3.

As indicated in Figures 6 to 8 inclusive, just rearwardly of the minimum contact pin 7 is a zero stop pin 9 and beyond the last contact pin 7''' is a permanent signal contact pin 10 which is exposed above the front face of the dial and its rear end, at the back face of said dial, carries a switch arm 11, which arm makes or breaks contact with pin 7''', as indicated in Figure 8 of the drawings.

A metallic thermostat finger 12 is secured at its lower end to the dial by a pivot stud 13, which stud extends through the dial plate, and at its back end, it is secured to the inner end of a thermostatic coil spring 14, which constitutes a sensitive element for the finger. The outer end of the coil spring is secured to a tension adjusting lever 15, which lever is held in its adjusted position by a locking screw 16 mounted in a radial slot 16' formed in the dial plate.

It will be noted that the pivot point of the thermostat finger 12 is aligned with, and off-set from the pivot 6 of the set-arm. Hence, due to the position of the finger pivot, when said finger, as indicated in Figure 2, describes a radial movement from the zero stop 9 to the switch controlled stop 10, its free end gradually rises in its travel, with relation to an arc line describing the position of the group of contact points from 7 to 7'''. In other words, the arc described by the end of the finger 12 and the arc described by the end of the set-arm 5 will intersect each other at the minimum contact point 7. Hence as the finger travels from right to left, its end will engage the set-arm and return the same to its minimum position over the contact point 7. At this point the end of the finger will pass through the loop or throat of the lip 5'. The parts will then assume their starting position, (as shown in Figure 2 of the drawings) ready to repeat a minimum signal operation.

As shown in Figure 6 of the drawings, the contact finger 12 and set-arm 5 are in their zero positions and as the finger 12 moves forward under heat control, it will engage and ride over the upper inclined face of the lip 5' depressing the same to engage the contact point and close the bell circuit D, whereby an alarm is sounded. The operator should then cut off the heater valve, whereby economy due to saving of fuel is accomplished.

In the event that the alarm is ignored, the tank water will continue to heat and the thermostatic finger, hence, will travel through its full radius and again close the alarm circuit by contacting with the point 7'''. The alarm will continue to ring until the circuit is manually broken by the arm 11.

A pointed locking screw 13' of the pivot stud 13 engages a metal contact plate 17, which plate in turn is secured to the dial 4 and connected to the terminal of the circuit wire 3', as best shown in Figures 2 and 5 of the drawings.

As shown, the circular dial is encased within a transparent cover 18 having a flange 18' which engages the periphery of the dial 4, said cover being preferably fabricated from a plastic material.

In the event that the tank A is located in the kitchen, where the temperature is considerably higher than the basement temperature, I provide a tension mechanism, previously described, in connection with the thermostat finger whereby the lever 15 is adjusted to regulate the thermostat movement from zero under slight tension.

As noted particularly in Figure 2 of the drawings, the set-arm is provided with a tail 6', which tail extends through an opening in the cover, whereby said set-arm is conveniently adjusted.

While I have shown and described one simple application of my invention to a water supply system, it is understood that I may vary the structural features within the scope of the claim, it being borne in mind that the thermostat may be utilized under certain conditions for other purposes.

I claim:

1. In a hot water supply system having a water tank and a connected water heater; the combination of hot water control therefore comprising a thermostat unit in contact with and secured to the tank at a predetermined distance from its top, the said unit comprising an insulator plate, a plurality of spaced contact points extending therethrough, a metallic strip connecting the same at the backface of said plate, a spring strip set-arm pivoted to the face of said plate, its free end being engageable with the contact points when depressed, an inclined surface tongue extending downwardly from the free end of the set-arm forming a throat with relation to the set-arm face, a pivoted metallic finger off-set from the set-arm pivot, and a thermostatic tensioned coil spring carried by the finger pivot for moving the metallic finger to engage the spring strip and cause said spring strip to be depressed to engage one of the contact points.

2. In a heat controlled electric circuit a thermostat comprising a plurality of contact pins, a thermostat finger movable under heat influence connecting a terminal of the circuit and adapted to travel over the contact pins, a yieldable set-arm selectively adjustable over the pins, a tongue folded over the set-arm end having an inclined upper face for engagement with the thermostat finger in one direction and a contact to close the circuit when the set arm is depressed, the thermostat finger in its reverse travel being adapted to pass through the throat of the set-arm.

ROLAND F. HENNINGFIELD.

REFERENCES CITED

The following references are of record in the file of this patent:

UNITED STATES PATENTS

| Number | Name | Date |
| --- | --- | --- |
| 313,313 | Gannaway | Mar. 3, 1885 |
| 948,405 | Webb | Feb. 8, 1910 |
| 1,944,841 | Kimball | Jan. 23, 1934 |
| 1,478,084 | Whittington | Dec. 18, 1923 |
| 1,567,589 | Greenawalt | Dec. 29, 1925 |
| 1,078,063 | Rancourt | Nov. 11, 1913 |
| 1,476,800 | Cosgray | Dec. 11, 1923 |
| 724,724 | Mitchell | Apr. 7, 1903 |
| 1,778,314 | Diodati | Oct. 14, 1930 |